Sept. 3, 1940.  J. E. CADY  2,213,303
DRYING APPARATUS
Filed Jan. 14, 1939  3 Sheets-Sheet 1
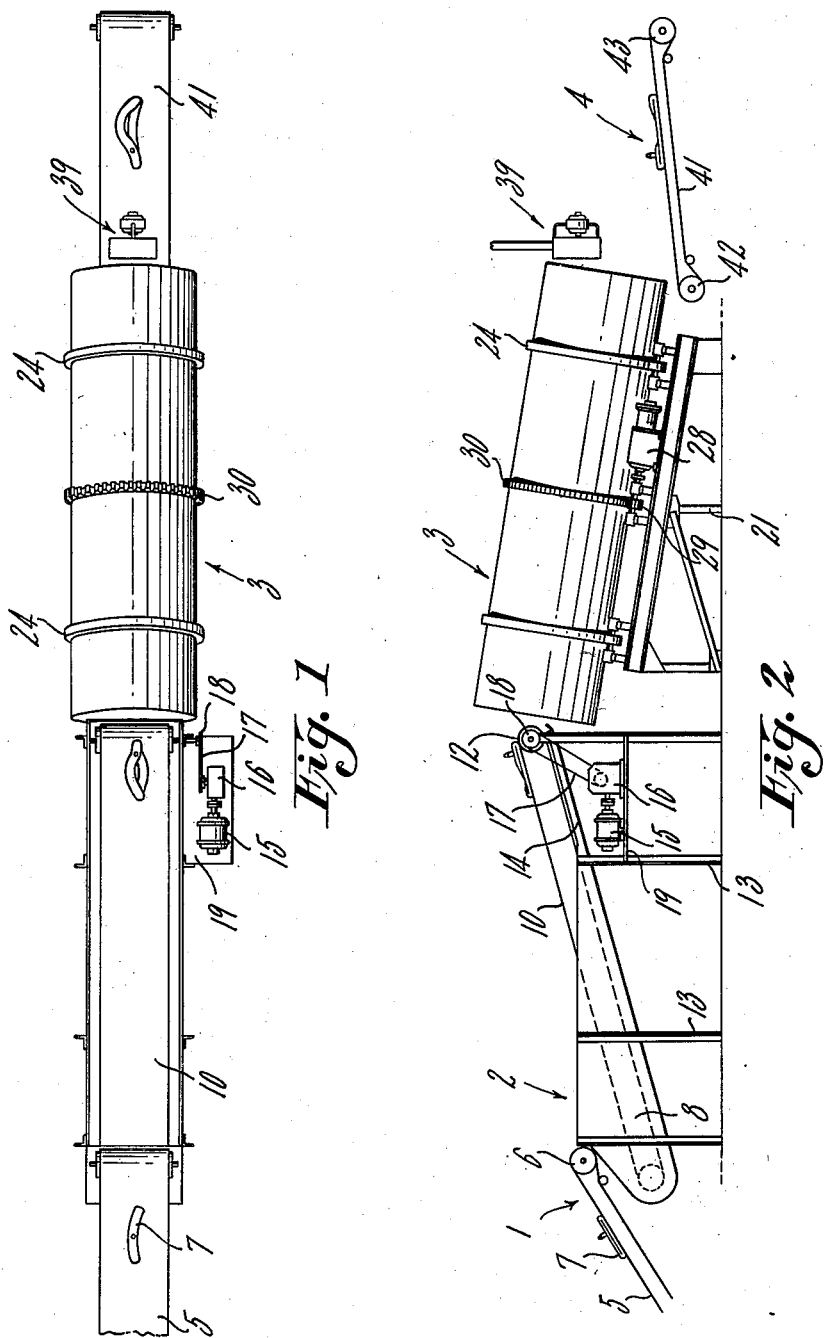
INVENTOR.
JOHN E. CADY
BY Gourley + Budlong
ATTORNEYS.

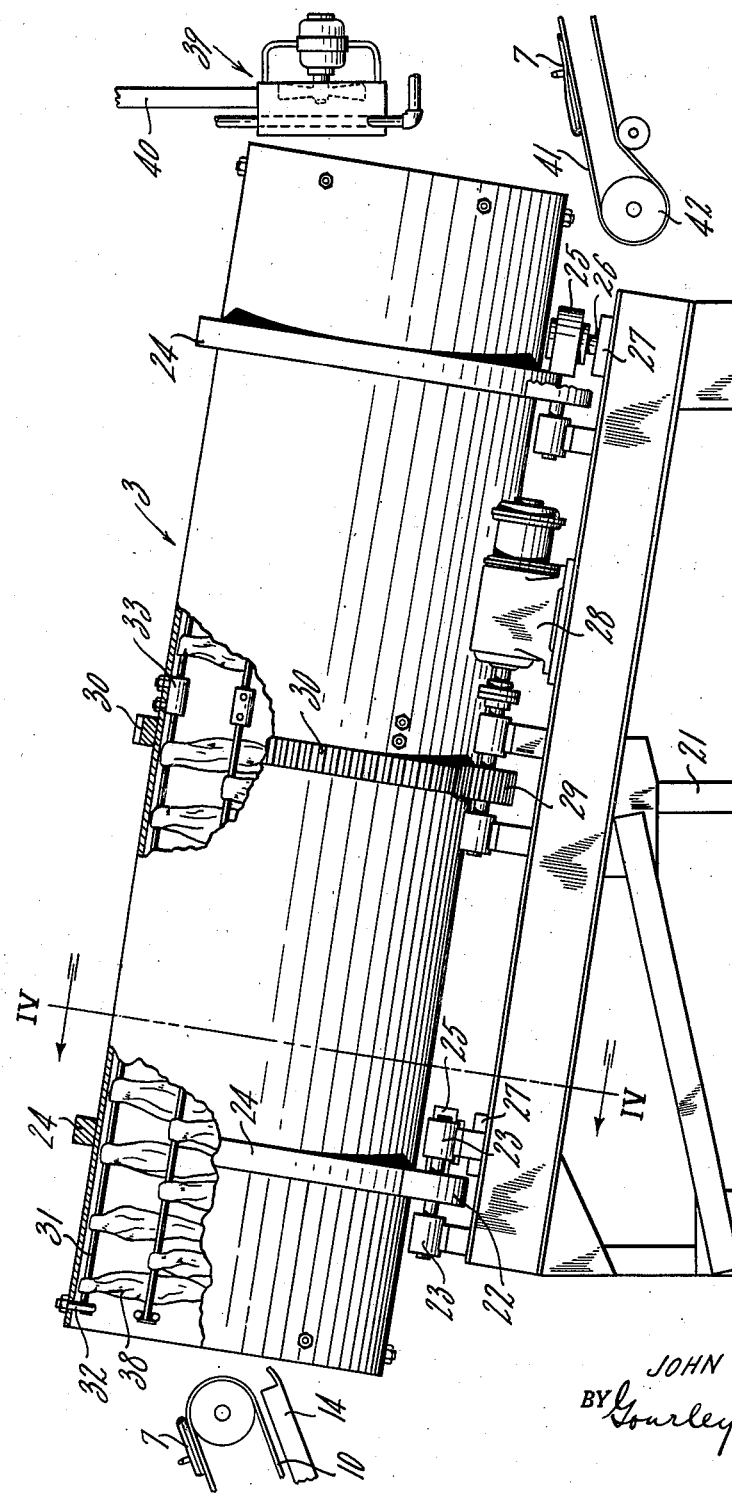

Sept. 3, 1940.    J. E. CADY    2,213,303
DRYING APPARATUS
Filed Jan. 14, 1939    3 Sheets-Sheet 3

INVENTOR.
JOHN E. CADY
BY Gourley + Budlong
ATTORNEYS.

Patented Sept. 3, 1940

2,213,303

UNITED STATES PATENT OFFICE 2,213,303

DRYING APPARATUS

John E. Cady, Indianapolis, Ind., assignor to United States Rubber Company, New York, N. Y., a corporation of New Jersey Application January 14, 1939, Serial No. 250,943

8 Claims. (Cl. 34—6)

This invention relates to inner tubes for pneumatic tires and similar flexible structures composed at least in part of rubber composition, and in particular it relates to an apparatus for drying the same.

In the manufacture of inner tubes and flexible articles of rubber composition it is customary practice to apply a dusting powder such as soapstone to the outer surface of the unvulcanized tube or article in order to render the surface less tacky. This dusting of the inner tube or flexible article of rubber composition, together with frequent manual handling thereof in subsequent manufacturing operations, results in the tube or article having a marred and unattractive appearance. In the sale of inner tubes and similar articles of rubber composition to the ultimate consumer it is highly desirable that the tubes or articles be clean and neat in appearance.

Hereinafter throughout the description that follows, for the sake of brevity and simplification thereof, reference will be made only to inner tubes in conjunction with my invention, but it is to be clearly understood that my invention is not limited solely to use with inner tubes but is similarly and equally useful and desirable in connection with other articles of rubber composition having properties and characteristics similar to those existing in inner tubes and thus requiring similar care and treatment.

I do not desire to limit this invention to use with any particular type of article to be cleaned and dried or just dried except in so far as is set forth in the appended claims, since it is readily apparent that my invention can be employed for articles of various types from the surfaces of which it is desirous to remove foreign particles and moisture.

Because of the flexible structure of inner tubes considerable difficulty has been encountered in cleaning the tubes so as to obtain a uniformly appearing surface. In accordance with the practice of my invention I provide automatic apparatus for cleaning inner tubes while the tubes are in an uninflated state which is continuous in operation and through which the tubes may move progressively. In the practice of my invention, I provide an economical arrangement for cooperation with continuously moving conveyors forming a part of conventional inner tube processing. These and other objects and advantages will appear more fully in the following detailed description when considered in connection with the accompanying drawings, in which:

Fig. 1 is a plan view of an apparatus embodying my invention;

Fig. 2 is a side elevational view thereof;

Fig. 3 is a side elevational view of a drier, partly broken away to show underlying constructions;

Figure 5:
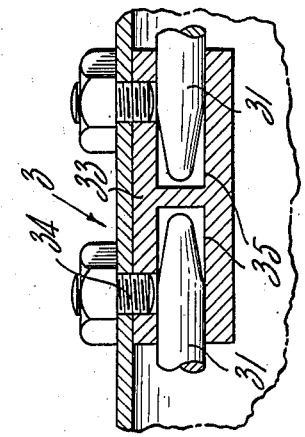
Fig. 5 is a side elevational view, partly in section, of a dipping tank and associated mechanism.
Figure 7:
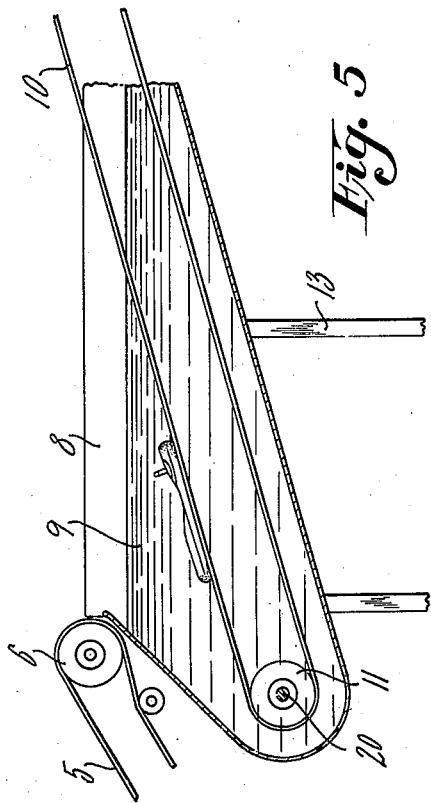
Figure 6:
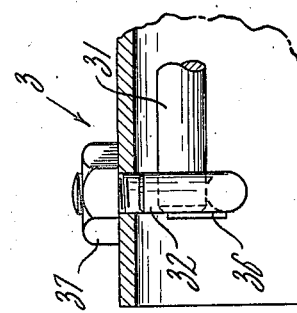
Fig. 6 is a detailed view, partly in section, showing a support for drying elements; and, Fig. 7 is a detailed view, partly in section, of additional means for supporting the drying elements.

Referring to the drawings, and in particular to Figs. 1 and 2, I show one form of embodiment of my invention which in general includes a conveyor 1 for feeding inner tubes to the cleaning and drying apparatus which includes a tank 2 into which inner tubes are immersed and a tumbling barrel 3 through which the inner tubes pass in a drying operation. The tubes then pass to a conveyor 4 which receives and carries them from the tumbling barrel to a subsequent operation preparatory for shipment.

The conveyor 1 which supplies inner tubes to the apparatus is illustrated diagrammatically and is of conventional construction, consisting generally of a conveyor belt 5 and a drive roller 6. This conveyor may be operated intermittently or continuously, depending on the particular operation which precedes the present cleaning operation. Inner tubes 7 are carried by the conveyor belt and are dropped therefrom into the tank 2.

As more particularly shown in Fig. 5, the tank 2 comprises a container 8 for holding a liquid 9 in such manner that inner tubes as they drop from the conveyor belt 5 will become completely submerged in the liquid. The liquid 9 may be merely a water bath containing a cleaning agent such as soap.

A conventional conveyor belt 10, supported by rollers 11 and 12 (Figs. 2 and 5), is located adjacent the inclined bottom of the container 8 and is positioned on an inclined plane for the purpose of removing inner tubes from the bath and depositing them in the drying barrel. This conveyor and the container 8 are supported from the floor by upright structural members 13. An extension or apron 14 projecting from the container 8 and along the under side of the conveyor belt 10 functions to catch drippings from the conveyor belt and return same to the container 8.

The conveyor belt 10 is driven continuously throughout the operation by a motor 15, suitable reduction gearing 16, chain 17 and sprocket 18. The motor 15 and reduction unit 16 are supported by a table 19 attached to the upright structural members 13. The opposite end of the conveyor belt 10 engaging the roller 11 is supported wholly within the container 8 and below the surface of the liquid 9. The roller 11 is rotatably mounted on a shaft 20, which in turn is attached to the sides of the container 8. The arrangement avoids the leakage of liquid from the container.

Figure 4:
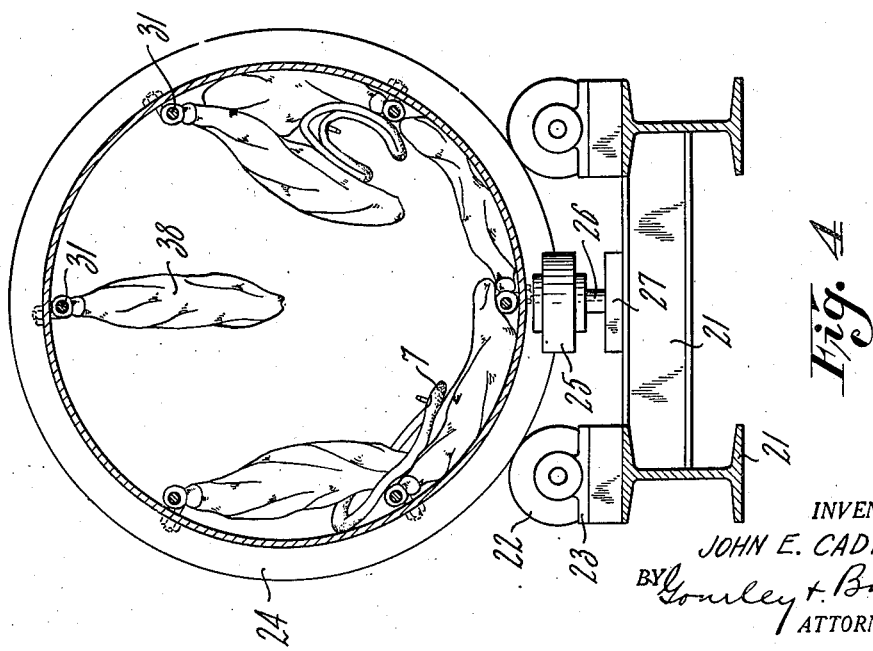
Fig. 4 is a transverse view, in section, of the drier, taken along lines IV—IV of Fig. 3.

As the inner tubes drop off the end of the conveyor 1 they become completely immersed in the bath 9 and rest on the moving conveyor belt 10, with the result that they are withdrawn from the bath by the conveyor belt 10 and are dropped from the end of the belt into the tumbling barrel 3. The barrel 3 is of tubular construction, open at both ends, and has its axis inclined sufficiently relative to the horizontal to provide a gradual progressive movement of the inner tubes through the barrel from the high end to the discharge end thereof. The barrel is supported upon a structural framework 21, by a plurality of wheels 22 (Figs. 3 and 4) rotatably mounted in bearings 23 attached to the framework 21 and circular tracks 24 surrounding and attached to the barrel 3. Rollers 25, having vertical axles 26, mounted in bearings 27 attached to cross members forming part of the framework 21, engage with the sides of the tracks 24 for the purpose of functioning as thrust mediums to maintain the barrel in a transaxial plane.

The barrel 3 is rotated continuously throughout the cleaning operation by a combination motor and reduction unit 28 mounted on the framework 21 and operatively connected to the barrel by a driving pinion 29 and ring gear 30. The ring gear 30 extends around the barrel and is secured thereto in any well known manner.

Within the barrel 3 are a plurality of rods 31 extending longitudinally of the barrel and attached to the wall thereof by means of outer rod supports 32 and inner supports 33. Because of the length of the barrel, it is preferable to provide two separate rods instead of one of continuous length. Each support 33 is attached to the barrel about midway of the ends thereof by means of studs 34, and is provided with apertures 35 for the reception of the ends of the rods 31. Each eye support 32 retains an opposite end of a rod 31 and a plate 36 closes the aperture of the eye support 32 to prevent axial movement of the rods 31. A nut 37 secures the eye support 32 to the wall of the barrel 3. As replaceable drying elements are secured to the rods 31, in the present arrangement all of the drying elements on one rod may be easily and quickly removed by merely detaching the eye support 32 and nut 37 and withdrawing the rod 31 from the barrel.

Secured to the rods 31 and in spaced relation are a plurality of drying elements 38. These drying elements may be of any absorbent material such as cotton cloth. Each drying element is formed of a bundle of material tied at one end to the rods 31, while the opposite end is left free to contact inner tubes as they move through the barrel 3. Preferably, the drying elements are of such length that during rotation of the barrel they will overlap, at least in part, the transversely adjacent drying element. The number of the drying elements within the barrel is such that each inner tube is continuously in engagement with one or more of the drying elements.

As the inner tubes first enter the barrel they carry with them a considerable amount of solution on their surfaces as a result of immersion in the bath. Therefore, those drying elements at the entrance of the barrel become wet with the solution, and in this state function as swabs to remove the surplus solution from the inner tubes. This operation gives the inner tubes a thorough cleaning, and as they progress along the barrel they encounter drying elements containing less moisture until the tubes are finally discharged, completely dry, from the barrel.

In order to prevent the drying elements from becoming too wet, a conventional heating unit 39 of the blower type is employed for directing a blast of air through the discharge end of the barrel. This medium for introducing hot air into the barrel maintains the drying elements 38, at least at the discharge end of the barrel, in a substantially dry condition; so that during the operation of the apparatus, the moisture content of successive drying elements along the barrel from the intake end to the discharge and progressively decreases. A structural framework 40 is used to suspend the heating unit 39 from a support such as a ceiling.

At the discharge end of the barrel 3 a conventional conveyor 4 is positioned. This conveyor, diagrammatically illustrated, includes a belt 41 and supporting rollers 42 and 43. One of these rollers may be driven continuously by conventional means, for the purpose of transporting inner tubes away from the barrel as soon as they are discharged therefrom.

As thus shown and described, it is apparent that I have provided an efficient means for cleaning and drying inner tubes and the like in a continuous and progressive manner, and which functions to impart a clean, lustrous finish to the surface of the inner tubes.

While I have shown one form of the invention, it is to be understood that it may be otherwise modified and various changes made therein without departing from the essence of the invention or the spirit thereof as more particularly appearing within the scope of the appended claims.

Having thus shown and described my invention, what I claim and desire to protect by Letters Patent is:

1. An apparatus for drying articles of rubber composition comprising a barrel having open ends for receiving and discharging said articles, means for rotating the barrel, means within the barrel for wiping and drying the articles, said last named means comprising a plurality of strips of soft pliable moisture absorbing material attached in circumferentially spaced relation to the barrel and having free ends for engaging the articles.

2. An apparatus for drying articles of rubber composition comprising an inclined barrel having open ends for receiving and discharging said articles, means for rotating said barrel, and means within the barrel for wiping and drying said articles comprising a plurality of strips of soft pliable moisture absorbing material attached in relatively spaced relation to the barrel and having free ends for engaging said articles.

3. An apparatus for drying articles of rubber composition comprising a barrel having open ends for receiving and discharging the articles, means for rotating the barrel, means within the barrel for wiping and drying the articles, said last mentioned means comprising a plurality of strips of soft pliable moisture absorbing material attached in axially and circumferentially spaced relation to the barrel and having free ends for engaging the articles, portions of said free ends being arranged to overlap adjacent circumferentially spaced strips of material during rotation of the barrel, and means for drying the moisture absorbed by said absorbing material.

4. An apparatus for drying articles of rubber composition comprising an inclined barrel having open ends for receiving and discharging the articles, means within the barrel for wiping and drying the articles, said means comprising a plurality of strips of soft pliable moisture absorbing material attached in longitudinally and transversely spaced relation to the barrel and having free ends for engaging the articles, portions of said strips being arranged to overlap adjacent transversely spaced strips of material during rotation of the barrel, means for causing air to pass through said barrel for drying the moisture absorbing material, and means for rotating the barrel.

5. An apparatus for drying articles of rubber composition comprising a barrel having open ends for receiving and discharging said articles, said barrel being inclined and having means for rotating same about its inclined axis, means within the barrel for wiping and drying the articles, said last mentioned means comprising a plurality of bars removably attached to said barrel and a plurality of strips of moisture absorbing material attached to each of said bars, portions of said strips being arranged to overlap adjacent strips of material during rotation of the barrel and having free ends for engaging the articles, and means for drying the moisture absorbed by said moisture absorbing material.

6. An apparatus for drying articles of rubber composition comprising a barrel having open ends for receiving and discharging the articles, and means within the barrel for wiping and drying the articles, said means comprising a plurality of transversely spaced bars removably attached in a longitudinal direction within the barrel and a plurality of strips of soft pliable moisture absorbing material attached to each bar and having free ends for engaging the articles.

7. An apparatus for drying articles of rubber composition comprising an inclined elongated barrel having open ends for receiving and discharging said articles, means for rotating said barrel about its longitudinal axis, means within said barrel for wiping and drying the articles placed therein, said wiping and drying means comprising longitudinally extending, circumferentially spaced, readily removable bars attached to such barrel and a plurality of moisture absorbing wiping strips attached to said bars and removable therewith.

8. An apparatus for drying articles of rubber composition comprising an inclined elongated barrel having open ends, means for rotating said barrel about its longitudinal axis, means within said barrel for wiping and drying articles placed therein, said wiping and drying means comprising longitudinally extending circumferentially spaced readily removable bars attached to said barrel and a plurality of moisture absorbing wiping strips carried by and removable with said bars, and means for circulating a drying gaseous medium through said barrel for drying the moisture absorbed by said strips during operation of said apparatus.

JOHN E. CADY.